US011183907B2

(12) United States Patent
Lin et al.

(10) Patent No.: US 11,183,907 B2
(45) Date of Patent: Nov. 23, 2021

(54) ELECTRICAL APPARATUS AND METHODS FOR FORMING AN ELECTRICAL MACHINE AND AN ELECTRICAL APPARATUS

(71) Applicant: ABB Schweiz AG, Baden (CH)

(72) Inventors: Chenjie Lin, Fuquay Varina, NC (US); Sheng Zhong, Hillsborough, NC (US); Jing Xu, Cary, NC (US)

(73) Assignee: ABB Schweiz AG, Baden (CH)

( * ) Notice: Subject to any disclaimer, the term of this patent is extended or adjusted under 35 U.S.C. 154(b) by 619 days.

(21) Appl. No.: 16/032,897

(22) Filed: Jul. 11, 2018

(65) Prior Publication Data
US 2020/0021175 A1 Jan. 16, 2020

(51) Int. Cl.
*H02K 1/20* (2006.01)
*H02K 9/19* (2006.01)
*H02K 5/20* (2006.01)
*H02K 15/03* (2006.01)
*H02K 9/197* (2006.01)
*H02K 9/193* (2006.01)
*H02K 15/12* (2006.01)
*H02K 15/10* (2006.01)

(52) U.S. Cl.
CPC ............ *H02K 15/03* (2013.01); *H02K 1/20* (2013.01); *H02K 9/193* (2013.01); *H02K 9/197* (2013.01); *H02K 15/10* (2013.01); *H02K 15/12* (2013.01); *H02K 5/20* (2013.01); *H02K 9/19* (2013.01)

(58) Field of Classification Search
CPC ............ H02K 1/20; H02K 5/20; H02K 9/19
USPC ...................... 310/52, 54, 216.119
See application file for complete search history.

(56) References Cited

U.S. PATENT DOCUMENTS

| 4,352,034 A * | 9/1982 | Karhan ............... H02K 9/10 310/59 |
| 4,691,131 A * | 9/1987 | Nakano ............... H02K 9/19 310/216.004 |
| 7,633,194 B2 | 12/2009 | Dawsey et al. |
| 8,872,399 B2 | 10/2014 | Chamberlin et al. |
| 9,362,788 B2 | 6/2016 | Shoykhet |
| 2006/0026820 A1* | 2/2006 | Rippel ............... H02K 1/20 29/609 |
| 2010/0019601 A1* | 1/2010 | Saban ............... H02K 1/278 310/156.28 |
| 2010/0102649 A1 | 4/2010 | Cherney et al. |

(Continued)

FOREIGN PATENT DOCUMENTS

WO 2014152624 A2 9/2014

OTHER PUBLICATIONS

Jere Kolehmainen, Jouni Ikaheimo and Ville Kivela, "Stator Air Channels Arranged from Rotated Identical Electric Sheets", IP.com Prior Art Database Technical Disclosure No. 000244242, Nov. 25, 2015 ABB (5 pages).

*Primary Examiner* — Gary A Nash
(74) *Attorney, Agent, or Firm* — Leydig, Voit & Mayer, Ltd.

(57) ABSTRACT

A method for manufacturing an electrical machine includes forming a plurality of laminations for a stator or a rotor, each lamination including a cooling aperture; stacking the laminations together, the cooling apertures being aligned to form a cooling passage; securing the stacked laminations together; and sealing the laminations together at at least one desired location by applying metal plating to the stacked and secured laminations at the at least one desired location.

18 Claims, 4 Drawing Sheets

(56) References Cited

U.S. PATENT DOCUMENTS

| | | | |
|---|---|---|---|
| 2011/0304229 A1* | 12/2011 | Pedersen | H02K 1/20 |
| | | | 310/59 |
| 2015/0280525 A1* | 10/2015 | Rippel | H02K 9/24 |
| | | | 310/54 |
| 2016/0006302 A1 | 1/2016 | Gugel et al. | |
| 2017/0063183 A1* | 3/2017 | Shrestha | H02K 1/22 |

* cited by examiner

ELECTRICAL APPARATUS AND METHODS FOR FORMING AN ELECTRICAL MACHINE AND AN ELECTRICAL APPARATUS

TECHNICAL FIELD

The present application relates generally to electrical devices and more particularly, but not exclusively, to an electrical apparatus and methods for forming an electrical machine and an electrical apparatus.

BACKGROUND

Electrical devices remain an area of interest. Some existing systems have various shortcomings, drawbacks and disadvantages relative to certain applications. For example, in some configurations of liquid cooled laminated components, the laminated components may be subject to leaking between laminations. Accordingly, there remains a need for further contributions in this area of technology.

SUMMARY

One embodiment of the present invention is a unique method for manufacturing an electrical machine. Another embodiment is a unique method for manufacturing an electrical apparatus. Another embodiment is a unique electrical apparatus. Other embodiments include apparatuses, systems, devices, hardware, methods, and combinations for laminated electrical components and machines or apparatuses that employ laminated electrical components. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
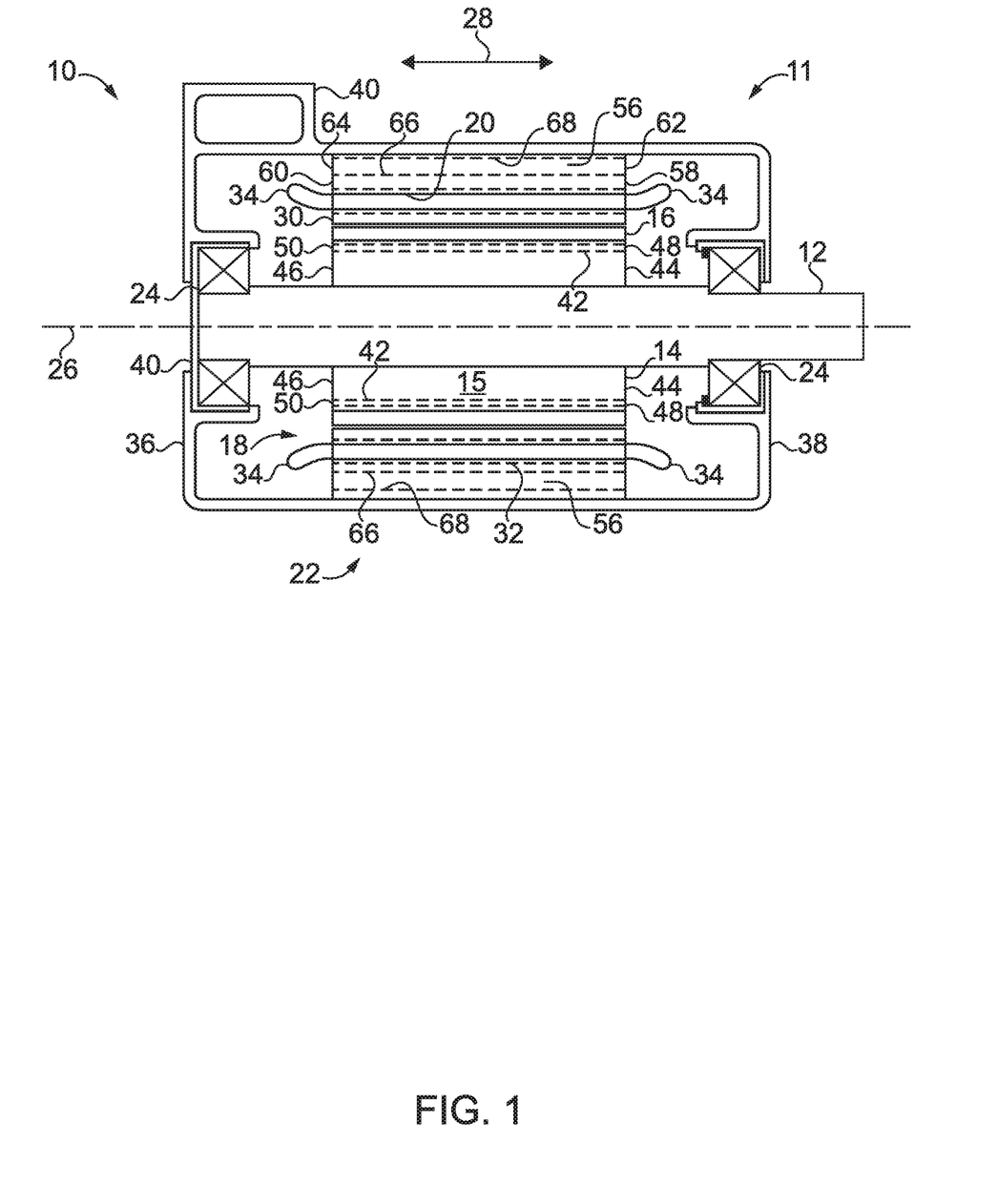
FIG. 1 schematically illustrates some aspects of a non-limiting example of an electrical apparatus in the form of an electrical machine in accordance with an embodiment of the present invention.

Referring to FIG. 1, some aspects of a non-limiting example of an electrical apparatus 10 in accordance with an embodiment of the present invention are schematically depicted. In one form, electrical apparatus 10 is an electrical machine 11, e.g., an internal permanent magnet (IPM) motor employing rare earth magnets. In other embodiments, electrical machine 11 may be an external permanent magnet motor. In still other embodiments, electrical machine 11 may be another type of permanent magnet motor, an induction motor, a switched reluctance, synchronous reluctance, or permanent magnet assisted reluctance motor, or any other type of motor, generator or motor/generator. In various embodiments, electrical machine 11 may be a radial flux machine, an axial flux machine or a machine having a three-dimensional (3D) flux path. In one form, electrical machine 11 is an industrial electrical machine, e.g., an industrial motor. In other embodiments, electrical machine 11 may not be an industrial electrical machine.

Electrical machine 11 includes a shaft 12, a rotor 14 having poles 16, which as an IPM rotor includes permanent magnets (in other embodiments, rotor 14 may be constructed as a rotor for various types of electrical machines, for example, permanent magnet machines, induction or synchronous reluctance machines, or other electrical machines, e.g., including but not limited to those listed above, and may or may not include permanent magnets), a stator 18 having a plurality of stator windings 20, a housing 22 and bearings 24. Shaft 12 and rotor 14 rotate about an axis of rotation 26, which defines an axial direction 28. Shaft 12 rotates with rotor 14, and may be considered a part of rotor 14. In one form, shaft 12 is coupled or affixed to rotor 14. In other embodiments, shaft 12 may be integral with rotor 14.

Shaft 12 is constructed to support rotor 14 and react radial and axial or thrust loads from rotor 14. In one form, shaft 12 is operative to transmit mechanical power from electrical machine 11 as an output of electrical machine 11. In other embodiments, shaft 12 may be operative to transmit mechanical power to and/or from electrical machine 11. Shaft 12 is axially and radially positioned by bearings 24. Shaft 12 and bearings 24 define axis of rotation 26 and corresponding axial direction 28.

Rotor 14 and stator 18 are in magnetic communication with each other. Rotor 14 is in magnetic cooperation with stator 18 to develop torque. Each of rotor 14/poles 16 and stator 18 have a construction that is operative to direct magnetic flux toward and away from each other. In some embodiments, rotor 14 may include other operative sources of magnetic flux, e.g., bus bars, windings or both, or other magnetic flux paths, in conjunction with or in place of permanent magnets 16, depending on the type of electrical machine 10.

In some embodiments, rotor 14 includes a laminated component 15 in the form of a laminated rotor core, referred to as laminated rotor core 15. A laminated component is a component formed of a plurality of laminations, e.g., a component formed of a plurality of electrical steel laminations. In such embodiments, laminated rotor core 15 is formed of a plurality of laminations that are stacked and affixed or joined together, and includes cooling passages for liquid cooling of rotor 14.

Stator 18 includes a laminated component 30 in the form of a laminated stator core, referred to as laminated stator back iron 30 or laminated stator core 30. Laminated stator core 30 is formed of a plurality of laminations that are stacked and affixed or joined together. Stator windings 20 are disposed within passages 32 in laminated stator core 30. In one form, stator windings 20 are copper conductors. In other embodiments, aluminum and/or other conductor materials may be employed in addition to or in place of copper. Stator windings 20 are constructed for magnetic communication and cooperation with poles 16. Stator windings 20 have overhangs 34 that extend beyond the ends of stator core 30, e.g., extend to the left and to the right of stator core 30 (in the perspective of the view of FIG. 1).

Housing 22 includes an endplate 36 disposed at one end of housing 22 and a second endplate 38 disposed at the other end of housing 22. In one form, endplate 36 is a non-drive end endplate, and endplate 38 is a drive-end endplate, or pulley endplate. In other embodiments, endplate 36 may be the drive-end endplate, and endplate 38 may be the non-drive end endplate. One or both of endplates 36 and 38 may be integral with housing 22. In some embodiments, housing 22 also includes a conduit box 40, which may or may not be integral, depending upon the embodiment. Other embodiments may not include a conduit box.

Bearings 24 are constructed to react shaft 12 and rotor 14 axial or thrust loads in axial direction 28, and to react shaft 12 and rotor 14 radial loads perpendicular to axis of rotation 26. Housing 22 is constructed to enclose stator 18 and react loads associated with stator 18, e.g., torque loads and any other loads generated due to magnetic interaction between stator 18 and rotor 14 during the operation of electrical machine 11. Housing 22 is also constructed to react thrust loads delivered through bearings 24.

In order to increase the power density of electrical machine 11, it is desirable to provide cooling, e.g., liquid cooling. Accordingly, embodiments of electrical machine 11 include provisions for providing liquid cooling of rotor 14 and/or of stator 18. For example, rotor 14 includes a plurality of cooling passages 42 extending through laminated rotor core 15 from one end 44 of rotor 14 to the other end 46 of rotor 14. In one form, the cooling passages 42 are water-cooling passages for passing water therethrough to remove heat from rotor 14. In other embodiments, other fluids may be used as heat transfer fluids. Each cooling passage 42 includes an inlet 48 for receiving cooling water and an outlet 50 for discharging the water. Means for delivering the cooling water and for receiving the discharged cooling water are not shown. In the illustration of FIG. 1, inlet 48 is disposed at end 44; and outlet 50 is disposed at end 46. It will be understood that in various embodiments, inlet 48 and outlet 50 may be disposed at any suitable location. The geometry of cooling passages 42 may vary with the needs of the application. Some embodiments may not include a liquid cooled rotor 14.

Similarly, some embodiments include a liquid-cooled stator 18. For example, stator 18 includes a plurality of cooling passages 56 extending through stator 18, e.g., through laminated stator core 30. In one form, the cooling passages 56 are water-cooling passages for passing water therethrough to remove heat from stator 18. In other embodiments, other fluids may be used as heat transfer fluids. Cooling passages 56 may be straight, zig-zag or helical in shape, e.g., a single helical passage wrapping around stator 18 or a plurality of offset helical passages wrapping around stator 18, or may have one or more other shapes. The geometry of cooling passages 56 may vary with the needs of the application. In the illustrated embodiment, cooling passages 56 extend from one end 58 of stator 18 and laminated stator core 30 to the opposite end 60 of stator 18 and laminated stator core 30. Each cooling passage 56 includes an inlet 62 for receiving cooling water and an outlet 64 for discharging the water. Each cooling passage is defined by internal surfaces, e.g., including radially inner surface 66 and radially outer surface 68. Means for delivering the cooling water and for receiving the discharged cooling water (not shown) may vary with the needs of the application. In the illustration of FIG. 1, inlet 62 is disposed at end 58; and outlet 64 is disposed at end 60. It will be understood that in various embodiments, inlet 62 and outlet 64 may be disposed at any suitable location.

Figure 2:
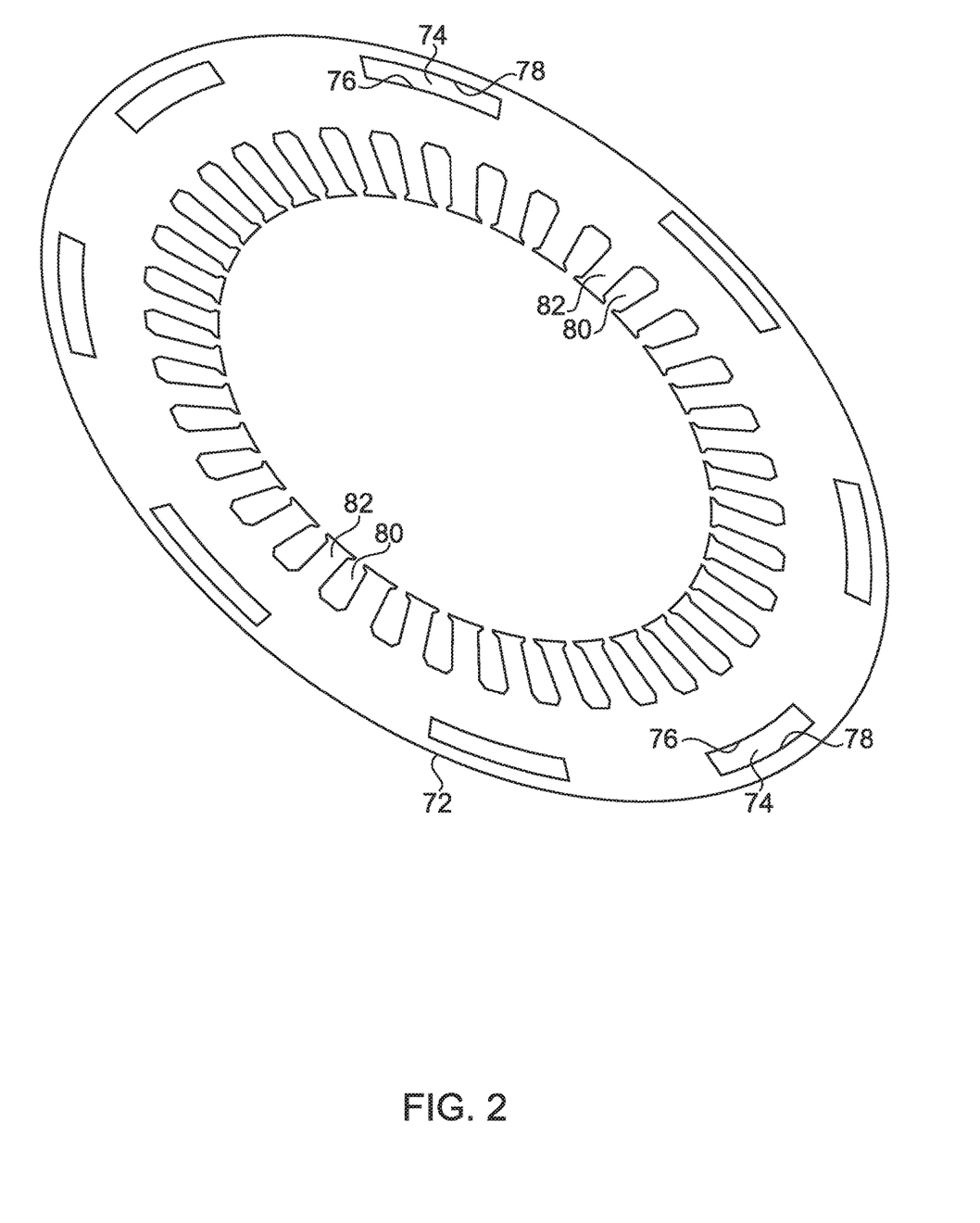
FIG. 2 illustrates some aspects of a non-limiting example of a lamination for forming a laminated component in the form of a laminated stator core in accordance with an embodiment of the present invention.

Referring also to FIG. 2, some aspects of a non-limiting example of a lamination 72 for forming a laminated component in the form of laminated stator core 30 is illustrated in accordance with an embodiment of the present invention. Lamination 72 includes a plurality of cooling apertures 74 that form cooling passages 56 (FIG. 1) when laminations 72 are stacked together to form laminated stator core 30 (FIG. 1). Each cooling passage 56 bridges a plurality of laminations, i.e., extends across a plurality of laminations. Apertures 74 include walls that form the internal surfaces of cooling passages 56, e.g., walls 76 and 78 that form respective surfaces 66 and 68 of cooling passages 56 when the laminations 72 are stacked together to form laminated stator core 30. Laminations 72 include openings 80 with lands 82 therebetween that form stator teeth when the laminations 72 are stacked together to form laminated stator core 30. Openings 80 form passages 32 in which stator windings 20 are disposed, and lands 82 form stator teeth, when laminations 72 are stacked together to form laminated stator core 30.

Laminated stator core 30 is formed by forming or providing a plurality of laminations 72, each lamination including one or more cooling apertures 74. The size and geometry of cooling apertures 74 may vary with the needs of the application. The laminations 72 are stacked together to form the laminated stator core 30, with the cooling apertures 74 being aligned to form cooling passages 56 of the desired shape, e.g., straight, zig-zag, helical or other cooling passage shape. The cooling passages 56 extend at least partially through the laminated component, e.g., laminated stator core 30, and in some embodiments extend completely through the laminated component. The stacked laminations 72 are then secured or fixed together, e.g., temporarily or permanently. For example, the stacked laminations may be clamped together, screwed together using one or more fasteners, welded together or otherwise fixed or secured together.

Each lamination is coated with an insulating material, for example and without limitation, a natural oxide, an enamel, a varnish, or another insulating material. Small gaps or micro-crevices may exist between the laminations, e.g., in the vicinity of cooling passages 56. The gaps may be caused by, for example, variations in the thickness of the laminations, variations in the thickness of the insulating material or other manufacturing or assembly related tolerances or variations, minor damage to the laminations or insulation material or other variations. The gaps may lead to leakages between laminations 72 when cooling liquid is supplied to cooling passages 56, e.g., depending upon the applied pressure of the cooling fluid. In many embodiments, water is used as a cooling fluid, e.g., due to its heat transfer properties. However, water can be corrosive and electrically conductive, and it is desirable to prevent leakage through the gaps. Accordingly, it is desirable to seal the gaps.

Figure 3A:
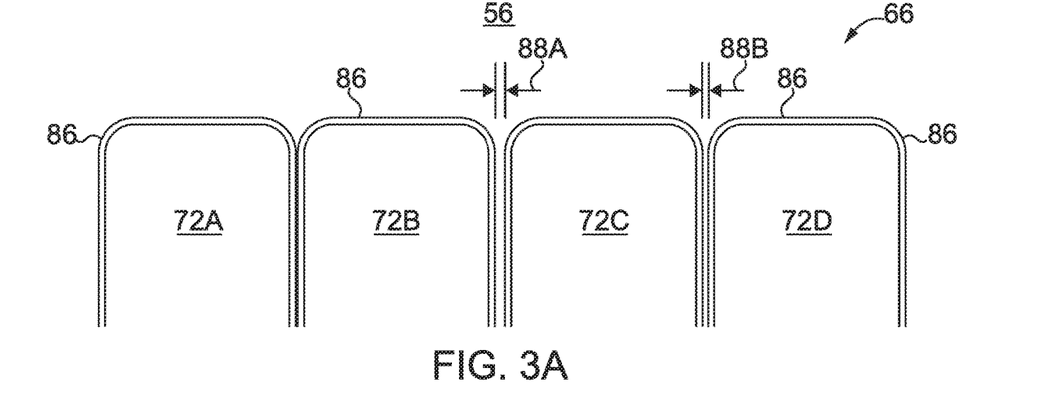
FIGS. 3A-3C illustrate some aspects of non-limiting examples of close-up views of laminations before and after metal plating in accordance with some embodiments of the present invention.

Referring also to FIG. 3A, laminations 72A, 72B, 72C and 72D are illustrated as forming a portion of cooling passage 56, in particular radially inner surface 66 of cooling passage 56. Each lamination is coated with a layer of insulating material 86. A micro-crevice or gap 88, e.g., illustrated as 88A and 88B, extends between at least some instances of two adjacent laminations. For example, a micro-crevice or gap 88A is present between laminations 72B and 72C. A micro-crevice or gap 88B is present between laminations 72C and 72D. No gap is present between laminations 72A and 72B. Gap 88A is larger than gap 88B. In order to prevent leakage of cooling fluid through gaps 88, e.g., water, from cooling passage 56, the laminations are sealed together at at least one desired location, i.e., at one or more desired locations, by applying metal plating to the stacked and secured laminations at the desired location(s), i.e., depositing the metal layer over the laminations at the desired location(s), e.g., along cooling passage 56. The metal plating layer is constructed to seal the gap(s) between adjacent laminations.

Figure 3B:
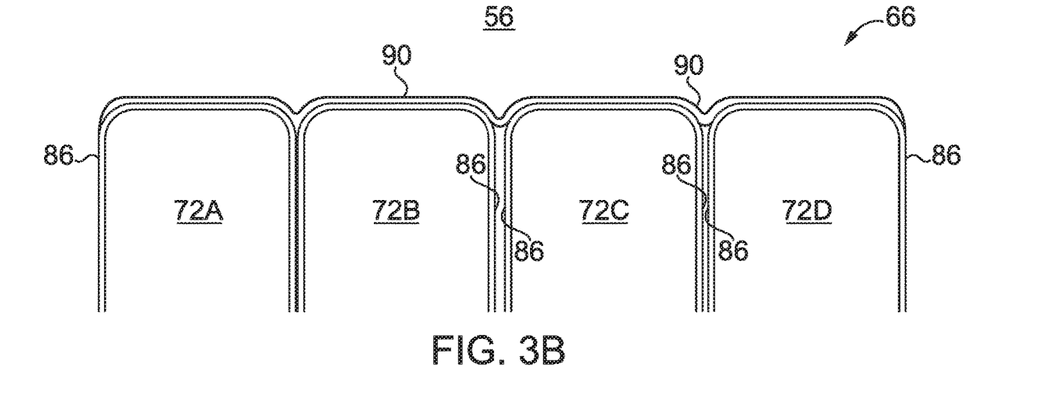

For example, as illustrated in FIG. 3B, the at least one desired location is or includes the cooling passage 56; and a metal plating 90 is applied to the laminations 72 (e.g., the illustrated laminations 72A, 72B, 72C and 72D) along the radially inner surface 66 of the cooling passage, which includes applying the metal plating 90 over the insulating material 86. In one form, the metal plating is electroless nickel plating. In other embodiments, other plating materials may be used with an electroless plating process, e.g., cobalt, copper and/or other materials. In still other embodiments, nickel, cobalt, copper and/or other materials may be used in an electrolytic plating process. The thickness of the plating may vary with the needs of the application. For example, in some embodiments, the plating may have a thickness of approximately 50 µm. In other embodiments, the plating may have a thickness between approximately 40 µm and 60 µm. In other embodiments, the plating thickness may be in the range of approximately 1 µm to 100 µm. In still other embodiments, the plating thickness may be greater or lesser, e.g., up to or greater than 1 mm or less than 1 µm.

Figure 3C:
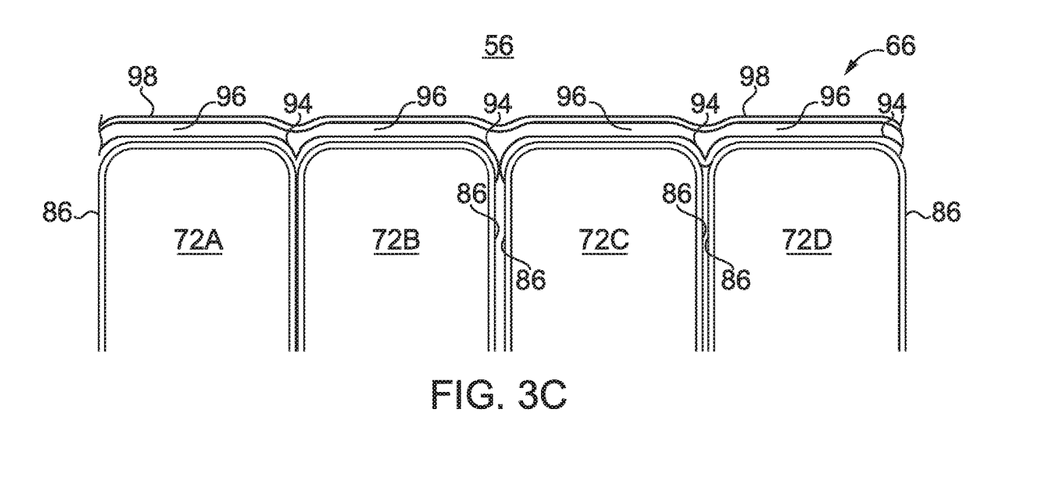

In the example of FIG. 3C, the metal plating, e.g., electroless nickel, is first applied as a thin seed layer 94, e.g., having a thickness of approximately 10 µm to 20 µm. The thickness of the seed layer 94 may vary with the needs of the application. A solder reflow layer 96 is then applied over the metal plating of seed layer 94. Seed layer 94 provides a metallic surface for solder reflow layer to adhere to. The thickness of solder reflow layer 96 is much greater than the thickness of seed layer 94, and may be, for example, 0.1 mm to 0.3 mm or thicker. The thickness of solder reflow layer 96 may vary with the needs of the application, and may be thinner or thicker than that mentioned herein. The use of the solder reflow layer 96 allows a thicker and in some embodiments mechanically stronger sealing layer, and may reduce overall plating time and cost by allowing the use of a thinner metal plating layer, i.e., seed layer 94. While still providing the desired sealing effect because of the thicker solder reflow layer 96.

In some embodiments, a metal plating layer 98, e.g., a thin metal plating layer, e.g., electroless nickel, is applied over the solder reflow layer 96, which provides protection of the solder reflow layer from erosion and corrosion and temperature effects, since the nickel plating is less susceptible to erosion and corrosion, and is higher temperature capable than solder reflow layer 96. Metal plating layer 98 may have, for example, a thickness of approximately 0.1 µm to 20 µm. The thickness of the metal plating layer 98 may vary with the needs of the application, and in some embodiments may be outside this range.

Figures 4A, 4B, 4C, 5A:
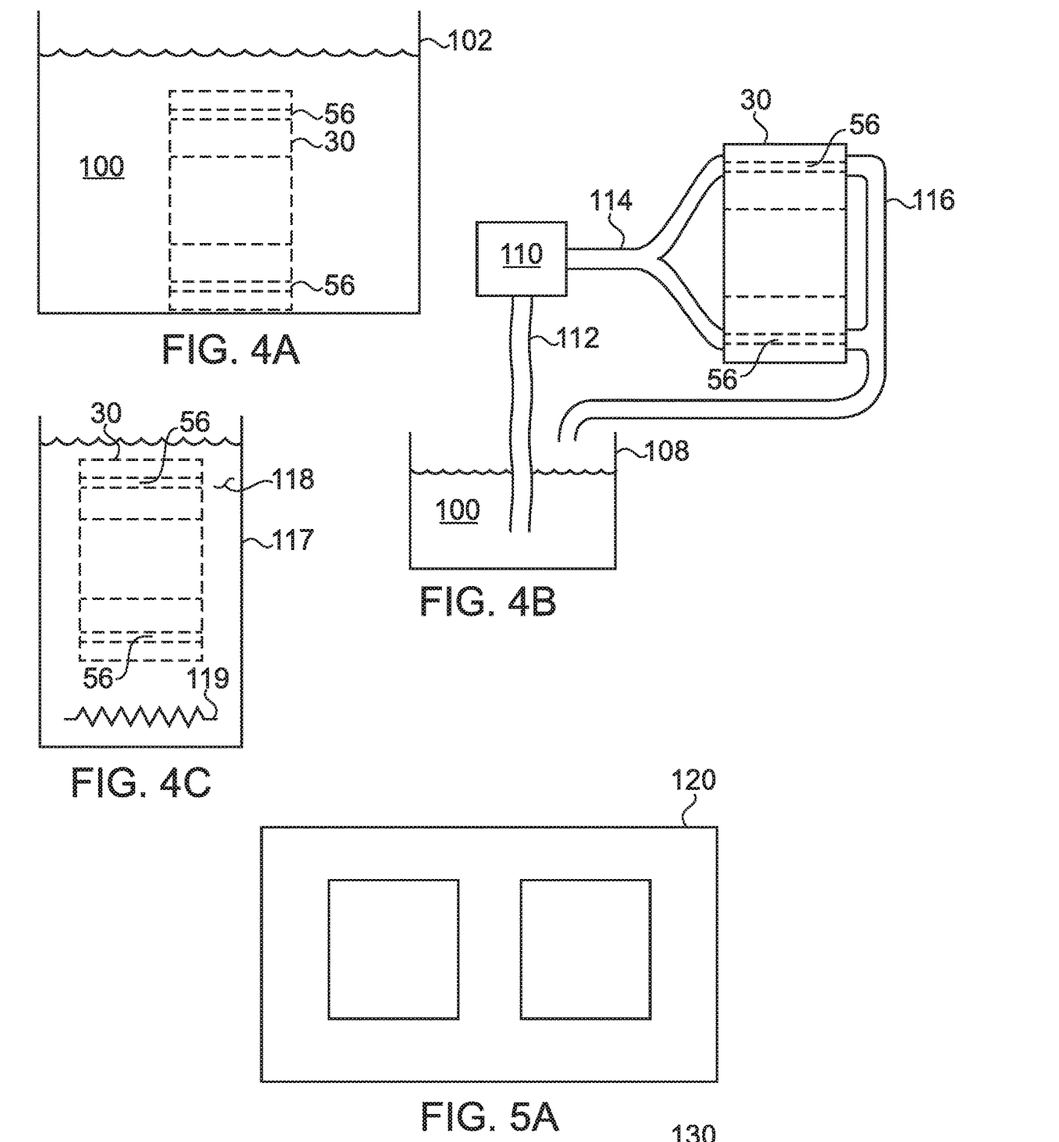
FIGS. 4A-4C, schematically illustrate some aspects of non-limiting examples of the application of a metal plating solution to a laminated component in accordance with some embodiments of the present invention.
FIGS. 5A and 5B schematically illustrated some aspects of non-limiting examples of laminated components of electrical apparatuses in accordance with an embodiment of the present invention.

Referring also to FIG. 4A-4B, some aspects of non-limiting examples of the application of a metal plating solution to laminated stator core 30 is illustrated. The metal plating solution may be any metal plating solution used to provide the desired electroless or electrolytic metal plating. An example of a metal plating solution suitable for providing an electroless nickel plating to a laminated component such as laminated stator core 30 is Niklad ELV 849 HS, available from MacDermid Inc., of Waterbury, Conn., USA.

In some embodiments, the metal plating, e.g., metal plating 90, seed layer 94, metal plating layer 98 and/or other layers or instances of metal plating are applied by immersing all or part of laminated stator core 30 in a bath of metal plating solution, i.e., immersing one or more desired locations on or within laminated stator core 30 for sealing by receiving metal plating in the bath of metal plating solution. For example, e.g., as depicted in FIG. 4A, laminated stator core 30 may be immersed in bath of metal plating solution 100 disposed in a tank 102, with cooling passages 56 exposed to the metal plating solution. In some embodiments, one or more stirrers and/or agitators and/or solution circulation systems of various types may be employed to ensure that the metal plating solution completely enters and/or fills all desired locations, including gaps and crevices between laminations. In some embodiments, one or more various locations on laminated stator core 30 may be masked, e.g., using wax, tapes and/or other suitable masking material(s), e.g., to prevent metal plating at such locations.

In some embodiments, the metal plating may be applied to desired locations, e.g., cooling passages 56, by passing the metal plating solution, e.g., exclusively, through cooling passages 56. For example, e.g., as depicted in FIG. 4B, the metal plating solution 100 may be disposed in a reservoir 108. A pump 110 may draw metal plating solution 100 from reservoir 108 using an inlet tube 112, and pump the metal plating solution 100 through an inlet manifold 114 into cooling passages 56, which may discharge the metal plating solution 100 through a discharge manifold 116 back into reservoir 108. In some embodiments, the direction of flow of the metal plating solution may be reversed or periodically reversed or the flow may be otherwise agitated in order to ensure that the metal plating solution 100 reaches the desired locations, and that metal plating is achieved at desired locations, e.g., within cooling passages 56, including within micro-crevices or gaps 88. In some embodiments, the laminated stator core 30 can be immersed in a hot bath 117 (FIG. 4C) of a heat transfer fluid 118, e.g., heated by a heating element 119, or may be otherwise heated to ensure that a desired plating temperature is achieved, i.e., a desired temperature for performing the plating operation, before and/or during the pumping of the plating chemical solution through the cooling passages 56.

Figure 5B:
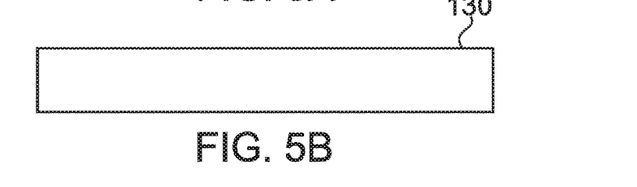

In addition to laminated components in the form of a liquid cooled stator core for an electrical machine or a liquid cooled rotor core for an electrical machine, e.g., as described above, in other embodiments of the present invention, the liquid cooled laminated components formed in accordance with the present disclosure may take other forms. For example, with reference to FIGS. 5A and 5B, some aspects of non-limiting examples of laminated components of electrical apparatuses, e.g., liquid cooled laminated components, are schematically illustrated in accordance with embodiments of the present invention. FIG. 5A illustrates a liquid cooled laminated component in the form of a transformer core 120. Cooling passages (not shown) may be disposed at suitable locations within transformer core 120. FIG. 5B illustrates a liquid cooled laminated component in the form of an inductor core 130, e.g., an inductor core for an electrical reactor or choke. Cooling passages (not shown) may be disposed at suitable locations within inductor core 130.

Embodiments of the present invention include a method for manufacturing an electrical machine, comprising: forming a plurality of laminations for a stator or a rotor, each lamination including a cooling aperture; stacking the laminations together, the cooling apertures being aligned to form a cooling passage; securing the stacked laminations together; and sealing the laminations together at at least one desired location by applying metal plating to the stacked and secured laminations at the at least one desired location.

In a refinement, the at least one desired location is the cooling passage, the cooling passage including a surface; the metal plating being applied to the laminations along the surface of the cooling passage.

In another refinement, the metal plating is electroless nickel plating.

In yet another refinement, each lamination is coated with an insulating material; and wherein the metal plating is applied over the insulating material.

In still another refinement, the at least one desired location includes the cooling passage, wherein the applying of the metal plating includes passing the metal plating solution through the cooling passage.

In an additional embodiment, the method further comprises heating the stacked laminations to a desired plating temperature prior to and/or during the passing of the metal plating solution through the cooling passage.

In yet still another refinement, the applying of the metal plating includes immersing the at least one desired location in a bath of metal plating solution.

In a further refinement, the metal plating is applied as a seed layer, further comprising applying solder reflow over the seed layer.

In a yet further refinement, the method further comprises applying additional metal plating over the solder reflow.

Embodiments of the present invention include a method for manufacturing an electrical apparatus, comprising: providing a plurality of laminations for a laminated component of the electrical apparatus, each lamination including a cooling aperture; stacking the laminations together to form the laminated component; aligning the cooling apertures to form a cooling passage extending at least partially through the laminated component; fixing the stacked laminations together; and sealing the laminations to prevent fluid leakage between the laminations from the cooling passage by applying metal plating to the laminations at at least one desired location.

In a refinement, the cooling passage includes an internal surface; the metal plating being applied to the laminations along the internal surface.

In another refinement, the metal plating is electroless nickel plating.

In yet another refinement, each lamination is coated with an insulating material; and wherein the metal plating is applied over the insulating material.

In still another refinement, the at least one desired location including the cooling passage, wherein the applying of the metal plating includes passing the metal plating solution through the cooling passage.

In an additional refinement, the method further comprises immersing the stacked laminations in a heating bath to achieve a desired plating temperature prior to and/or during the passing of the metal plating solution through the cooling passage.

In yet still another refinement, the applying of the metal plating includes immersing the at least one desired location in a bath of metal plating solution.

In a further refinement, the metal plating is applied as a seed layer, further comprising applying solder reflow over the seed layer.

In a yet further refinement, the method further comprises applying additional metal plating over the solder reflow.

In a still further refinement, the laminated component is a stator core for an electrical machine; a rotor core for an electrical machine, a transformer core or an inductor core.

Embodiments of the present invention include an electrical apparatus, comprising: a laminated component including a cooling passage bridging a plurality of laminations, the laminated component having a gap between two adjacent laminations; and a metal plating layer deposited over the laminations along the cooling passage and constructed to seal the gap.

In a refinement, the metal plating is electroless nickel plating.

In another refinement, the electrical apparatus further comprises a solder reflow layer disposed over the metal plating layer, and an additional metal plating layer disposed over the solder reflow layer.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for manufacturing an electrical machine, comprising:
    forming a plurality of laminations for a stator or a rotor, each lamination including a cooling aperture;
    stacking the laminations together, the cooling apertures being aligned to form a cooling passage;
    securing the stacked laminations together; and
    sealing the laminations together at at least one desired location by applying at least two layers to the stacked and secured laminations at the at least one desired location, wherein a first layer includes metal plating applied as a seed layer and a second layer includes solder reflow applied over the seed layer.

2. The method of claim 1, wherein the at least one desired location is the cooling passage, the cooling passage including a surface; the metal plating being applied to the laminations along the surface of the cooling passage.

3. The method of claim 2, wherein the metal plating is electroless nickel plating.

4. The method of claim 1, wherein each lamination is coated with an insulating material; and wherein the metal plating is applied over the insulating material.

5. The method of claim 1, wherein the applying of the metal plating includes immersing the at least one desired location in a bath of metal plating solution.

6. The method of claim 1, further comprising applying another layer of metal plating over the solder reflow.

7. A method for manufacturing an electrical machine, comprising:
   forming a plurality of laminations for a stator or a rotor, each lamination including a cooling aperture;
   stacking the laminations together, the cooling apertures being aligned to form a cooling passage;
   securing the stacked laminations together;
   passing a metal plating solution through the cooling passage to apply metal plating to the stacked and secured laminations to seal the laminations together at the cooling passage; and
   heating the stacked laminations to a desired plating temperature prior to and/or during the passing of the metal plating solution through the cooling passage.

8. A method for manufacturing an electrical apparatus, comprising:
   providing a plurality of laminations for a laminated component of the electrical apparatus, each lamination including a cooling aperture;
   stacking the laminations together to form the laminated component;
   aligning the cooling apertures to form a cooling passage extending at least partially through the laminated component;
   fixing the stacked laminations together; and
   sealing the laminations to prevent fluid leakage between the laminations from the cooling passage by applying at least two layers to the laminations at the cooling passage, wherein the applying includes passing a metal plating solution through the cooling passage to apply a layer of metal plating while the stacked laminations are immersed in a heating bath to achieve a desired plating temperature prior to and/or during the passing of the metal plating solution through the cooling passage.

9. The method of claim 8, the cooling passage including an internal surface; the metal plating being applied to the laminations along the internal surface.

10. The method of claim 8, wherein the metal plating is electroless nickel plating.

11. The method of claim 8, wherein each lamination is coated with an insulating material; and wherein the metal plating is applied over the insulating material.

12. The method of claim 8, wherein the bath is metal plating solution.

13. The method of claim 8, wherein the laminated component is a stator core for an electrical machine; a rotor core for an electrical machine, a transformer core or an inductor core.

14. A method for manufacturing an electrical apparatus, comprising:
   providing a plurality of laminations for a laminated component of the electrical apparatus, each lamination including a cooling aperture;
   stacking the laminations together to form the laminated component;
   aligning the cooling apertures to form a cooling passage extending at least partially through the laminated component;
   fixing the stacked laminations together; and
   sealing the laminations to prevent fluid leakage between the laminations from the cooling passage by applying at least two layers to the laminations at at least one desired location, wherein a first layer is metal plating applied as a seed layer and a second layer includes solder reflow applied over the seed layer.

15. The method of claim 14, further comprising applying a second layer of plating over the solder reflow.

16. An electrical apparatus, comprising:
   a laminated component including a cooling passage bridging a plurality of laminations, the laminated component having a gap between two adjacent laminations;
   at least two layers deposited over the laminations along the cooling passage and constructed to seal the gap, the at least two layers including a first metal plating layer and a solder reflow layer disposed over the first metal plating layer.

17. The electrical apparatus of claim 16, wherein the metal plating is electroless nickel plating.

18. The electrical apparatus of claim 16, further comprising a second metal plating layer disposed over the solder reflow layer.

* * * * *